Figure 1:
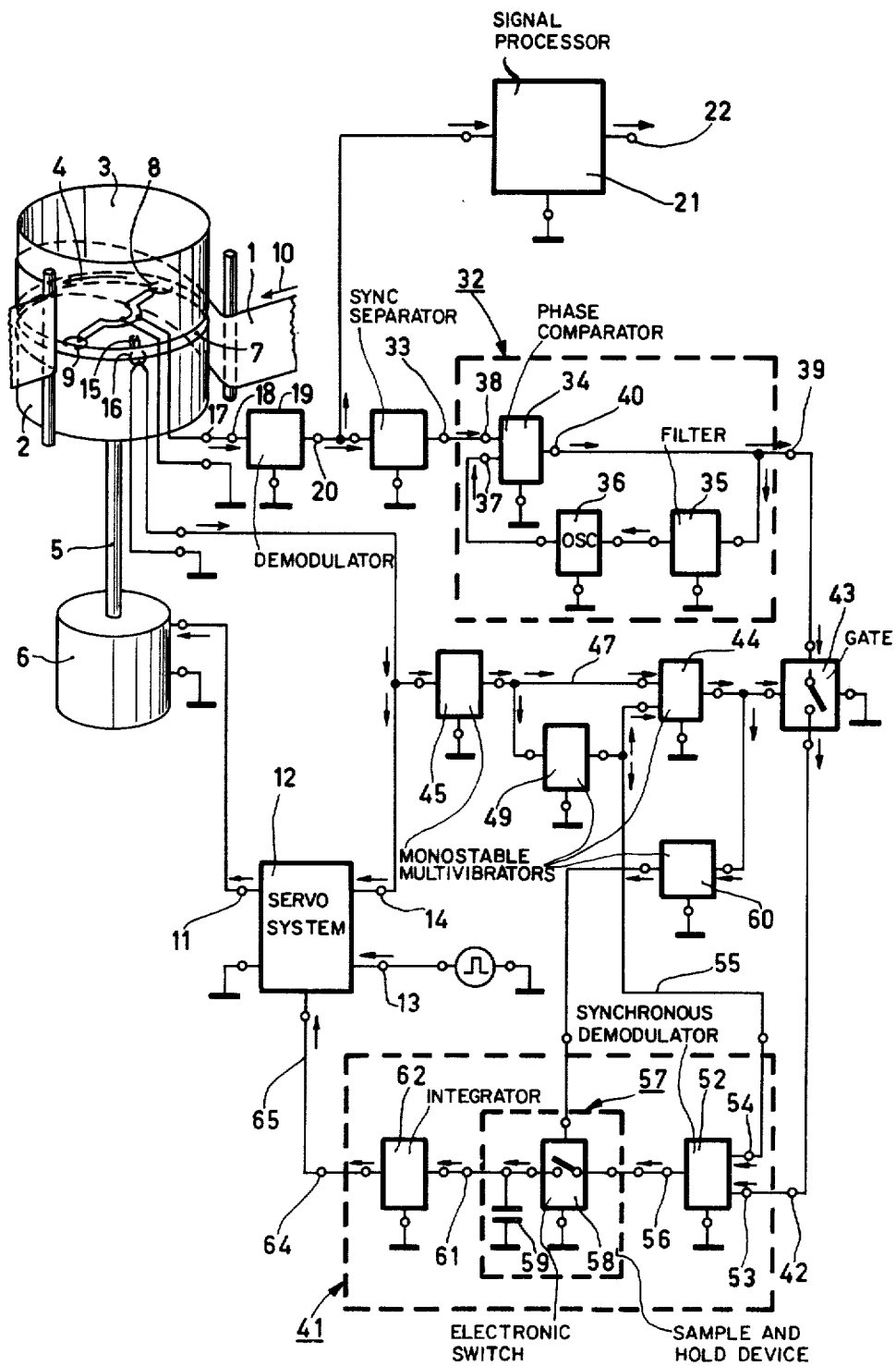

United States Patent [19]

Melwisch et al.

[11] 4,297,731
[45] Oct. 27, 1981

[54] PLAYBACK APPARATUS FOR CORRECTING LOCKING ERRORS

[75] Inventors: Harald Melwisch, Vienna, Austria; Hendrikus Looren de Jong, Eindhoven, Netherlands

[73] Assignee: U.S. Philips Corporation, New York, N.Y.

[21] Appl. No.: 15,019

[22] Filed: Feb. 26, 1979

Related U.S. Application Data

[63] Continuation of Ser. No. 807,976, Jun. 20, 1977, abandoned.

[30] Foreign Application Priority Data

Jul. 30, 1976 [AT] Austria .................................. 5674/76

[51] Int. Cl.³ ....................... G11B 27/10; G11B 21/10
[52] U.S. Cl. ......................................... 360/70; 360/75; 360/77
[58] Field of Search ....................... 360/21, 33, 77, 75, 360/70

[56] References Cited

U.S. PATENT DOCUMENTS

| 3,385,926 | 5/1968 | Tonka | 360/70 |
| 3,636,252 | 1/1972 | Kowal | 360/70 |
| 3,668,492 | 6/1972 | Konishi | 360/75 |
| 3,705,840 | 12/1972 | Kosugi | 360/70 |
| 3,919,697 | 11/1975 | Walker | 360/77 |
| 3,925,816 | 12/1975 | Kihara | 360/33 |
| 4,012,771 | 3/1977 | Ishigaki | 358/4 |
| 4,047,231 | 9/1977 | Garagnon | 360/70 |
| 4,056,832 | 11/1977 | Boer | 360/70 |
| 4,120,008 | 10/1978 | Metzger | 360/77 |

Primary Examiner—Alan Faber
Attorney, Agent, or Firm—Thomas A. Briody; William J. Streeter; Algy Tamoshunas

[57] ABSTRACT

In a helical scan recorder using multiple heads having gaps positioned at different azimuth angles tracking errors are detected by signal processing the normal synchronization pulses recorded with the television signal. The signal processing is accomplished by using a phase shift detection circuit and a difference circuit for subtracting signals from the phase shift circuit indicating the instantaneous phase shifts produced by the tracking errors.

4 Claims, 5 Drawing Figures

PLAYBACK APPARATUS FOR CORRECTING LOCKING ERRORS

This is a continuation of application Ser. No. 807,976, filed June 20, 1977, now abandoned.

The invention relates to playback apparatus for television signals containing synchronizing pulses, which signals are recorded on a record carrier in oblique signal tracks, which apparatus, for scanning the tracks, comprises a rotary transducer arrangement with at least two magnetic heads, whose effective gaps have mutually different azimuth angles. Such apparatus is for example described in German Pat. No. DT-OS 25 04 608, corresponding to U.S. Pat. No. 4,012,771. For the correct reproduction of the signals recorded on a record carrier it is essential that in such apparatus the magnetic heads of the transducer arrangement exactly follow the individual signal tracks on the record carrier, because any tracking error results both in a deterioration of the signal-to-noise ratio of the reproduced signal and in the occurrence of interference owing to crosstalk from the adjacent track.

It is an object of the invention to propose steps in order to ensure that in an apparatus of the type mentioned in the preamble the magnetic heads automatically follow the signal tracks on the record carrier in an optimum manner. For this the invention is characterized in that there is provided a detection circuit for phase shifts between consecutive pulse trains, which circuit receives the synchronizing pulse trains extracted from the reproduced signal as an input signal and supplies a pulse-shaped output signal whose magnitude and polarity correspond to the instantaneous phase shift. The pulse-shaped output signal is applied to a circuit for the formation of the difference between the output signals of the phase-shift detection circuit whose output signal in its turn serves as an additional control signal for a servo system which is adapted to control the phase relationship between the signal tracks recorded on the record carrier and the tracks on the record carrier actually scanned by the magnetic heads.

A major advantage of the steps in accordance with the invention is their simplicity, because in order to obtain the additional control signal for the servo system no separate control signals have to be recorded during recording of the television signals on the record carrier, but the synchronizing pulses, which are already contained in television signal and which are recorded simultaneously with said signal, are directly used for this purpose.

In this respect it is to be noted that in such playback equipment it is of course known to provide servo systems for the drive system of the transducer arrangement or the record carrier respectively, which by a comparison between an actual signal and a desired signal form an error signal by means of which the phase relationship or the speed of the component to be driven can be controlled in such a way that a specific relationship with the conditions during signal recording is maintained. Such servo systems generally also comprise a manually adjustable control for adjusting the corresponding phase relationship. However, such conventional servo systems are not capable of automatically eliminating tracking errors between the tracks actually scanned by the magnetic heads on the record carrier and the signal tracks stored on the record carrier, because such tracking errors result from system changes between a recording operation and a playback operation. Such tracking errors cannot be compensated for with other known control devices for influencing the tension of the record carrier, because these control devices which are also referred to as tape-tension control devices can only compensate for errors as a result of the fact that the tracks actually scanned on the record carrier by the magnetic head are shorter or longer than the signal tracks recorded on the record carrier. The last-mentioned errors are for example the result of length variations of the record carrier or changes in the diameter of the transducer arrangement.

For realizing the detection circuit for phase shifts between consecutive pulse trains there are several possibilities, because for this purpose conventional methods of time, frequency or phase measurement may be employed. However, it is found to be particularly advantageous when the detection circuit for phase shifts is constituted by a phase-locked loop, because in this way a particularly good immunity to noise is obtained. The phase-locked loop can be realized in different state-of-the-art manners.

For a particularly simple circuit design it is found to be advantageous when the circuit for the difference formation is constituted by a synchronous demodulator followed by an integration stage, the output signals of the phase-shift detection circuit being applied to one input of the synchronous demodulator and the pulses of a pulse train which identifies every second transition of the magnetic heads of the transducer arrangement from one signal track to the next signal track to the other input.

It is also found to be advantageous when the circuit for the difference formation is constituted by two sample and hold devices followed by a circuit for the logic combination of the output signals of the two sample and hold devices, these two sample and hold devices alternately storing the output signals of the phase-shift detection circuit, under control of sampling pulse trains which identify the transitions of the magnetic heads from one signal track to the next signal track. As this does not require the use of an integration stage with a larger time constant, such a circuit arrangement provides particularly satisfactory control properties for rapid control operations. The sample and hold devices, hereinafter referred to as its sample and hold circuits, can again be realized in any known manner.

The invention will now be described in more detail with reference to the drawings which show two embodiments of the invention, to which the invention is not limited.

FIG. 1 is a block diagram, partly in schematic form, of the parts of a first embodiment which are essential for the invention.

Figure 2:
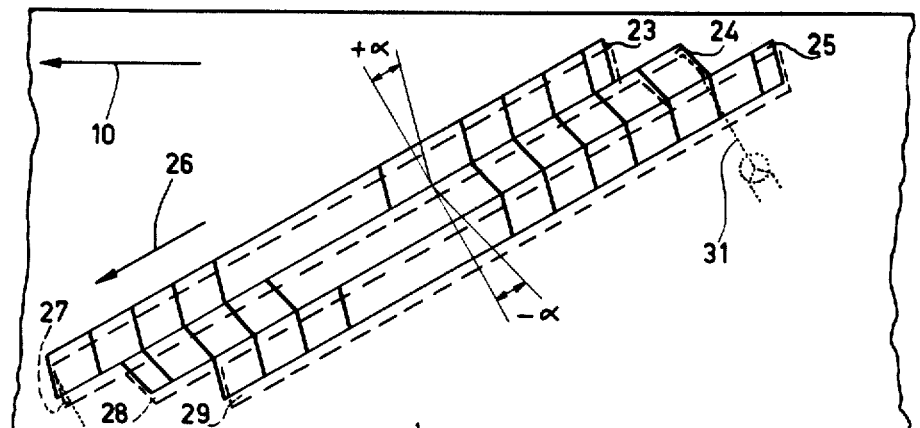

FIG. 2 schematically shows the layout of the signal tracks on a record carrier.

Figure 3:
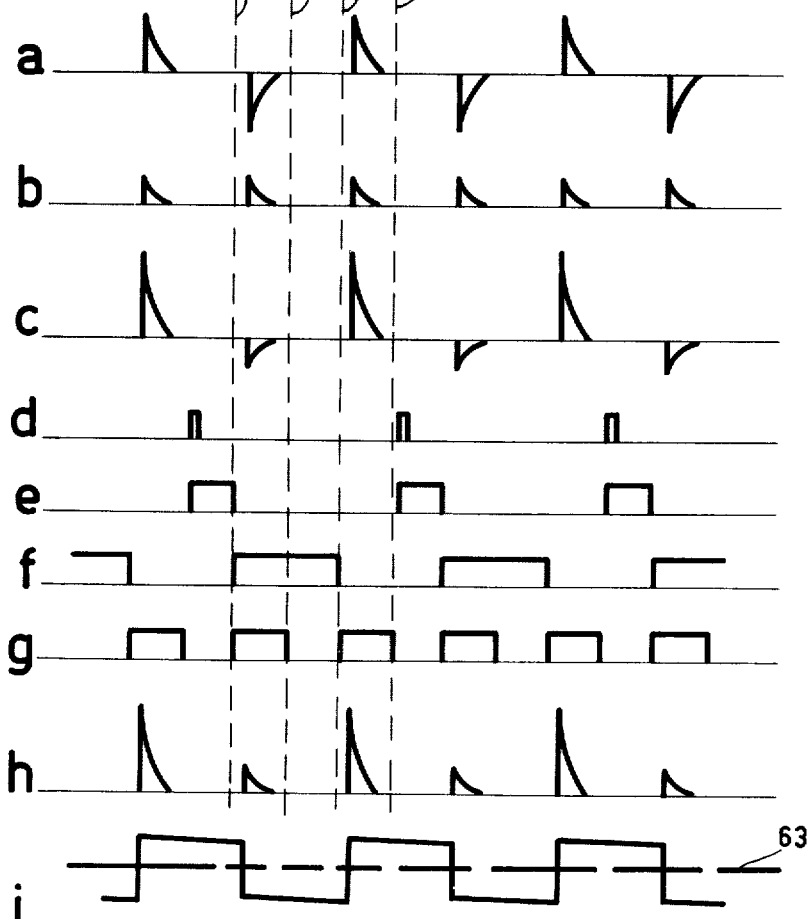

FIG. 3 under a to i shows waveform diagrams associated with the embodiment of FIG. 1.

Figure 4:
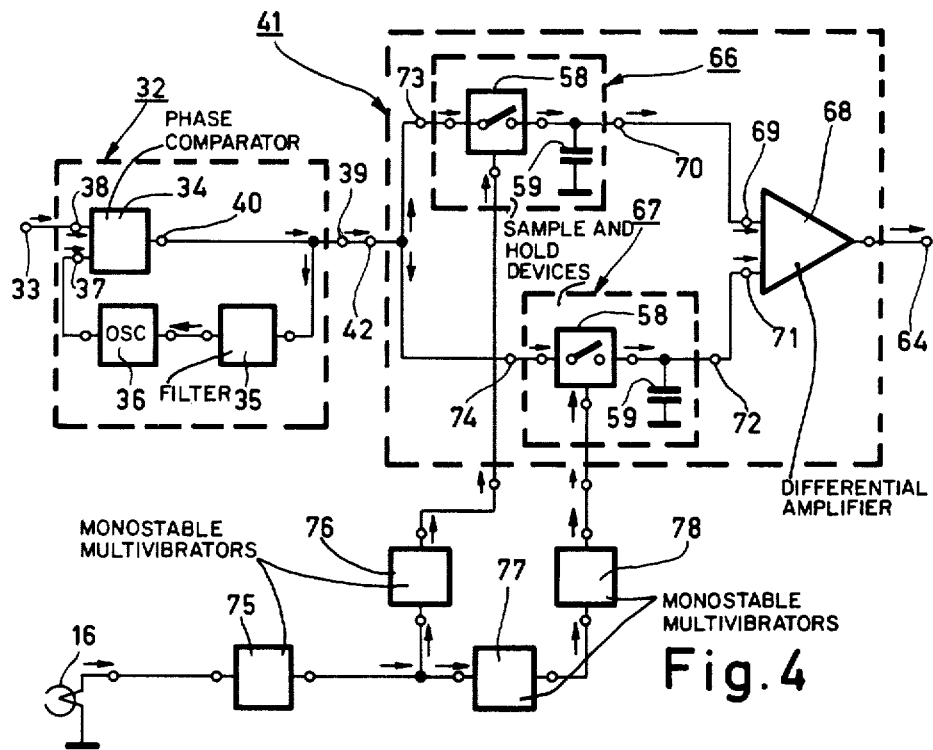

FIG. 4 is a block diagram of a second embodiment with a circuit for the difference formation which is modified with respect to the embodiment of FIG. 1.

Figure 5:
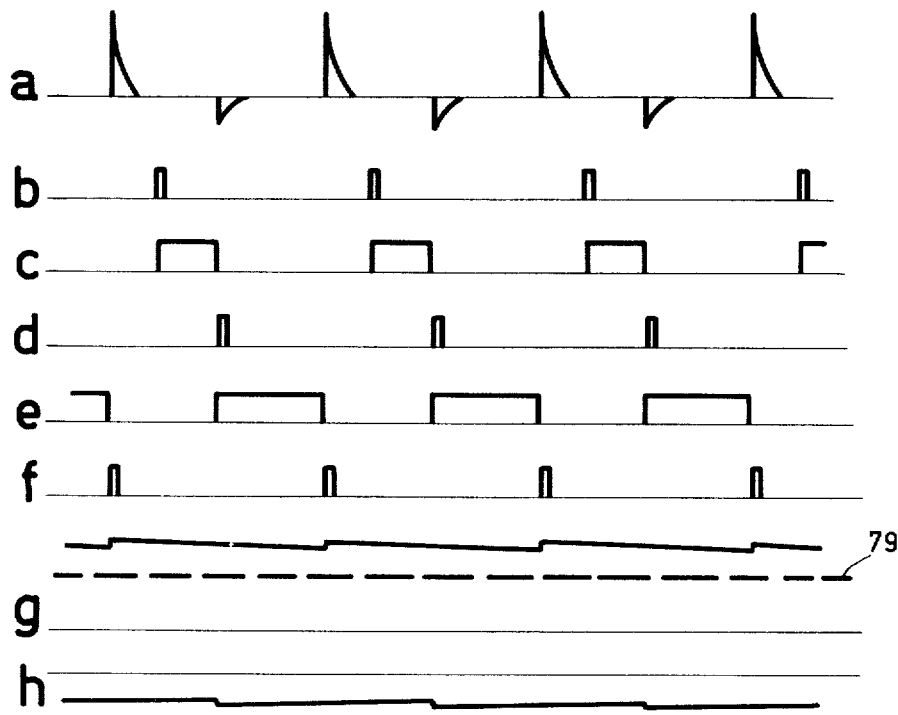

FIG. 5 under a to h shows waveform diagrams associated with the embodiment of FIG. 4.

In FIG. 1 the reference numeral 1 designates a record carrier, which is passed around the surfaces of two coaxially arranged drum halves 2 and 3 in a helical path through an angular range of 180°. The drum half 2 is stationarily mounted, whereas the drum half 3 can be driven to rotate in counterclockwise direction in accordance with the arrow 4. For this purpose the drum half 3 is mounted on a spindle 5 which is connected to a motor 6. Between the two drum halves 2 and 3 a slot 7 is formed from which two schematically represented magnetic heads 8 and 9 project. The heads are mounted on the rotatable drum half 3 diametrically opposite each other. The drum half 3 and the magnetic heads 8 and 9 thus constitute a rotary transducer arrangement, the magnetic head scanning oblique tracks on the record carrier. In fact at any given time only one magnetic head is in operative contact with the record carrier, because one magnetic head starts scanning a track when the other magnetic head just leaves the preceding track. The record carrier itself is then moved in the direction of the arrow 10 with the aid of means, not shown, as for example a drive spindle and a pressure roller which cooperates therewith, so that the magnetic heads scan adjacent tracks on the record carrier.

For its power supply the motor 6 which drives the transducer arrangement is connected to the output 11 of a servo system 12, which receives a reference signal, which is for example derived from the line voltage, at its input 13 and an actual signal at its input 14. To obtain this actual signal a permanent magnet 15 is disposed at the circumference of the rotatable drum half 3, which magnet cooperates with a stationary magnetic head 16, which is connected to the input 14 of the servo-system. Thus, a pulse is generated upon each revolution of the transducer arrangement, which as the actual signal is compared with the reference signal in the servo system 12. From this comparison between the two signals the servo system derives a control signal which controls the motor 6 so that in accordance with the record-carrier drive the phase relationship between the signal tracks recorded on the record carrier and the tracks on the record carrier which are actually scanned by the magnetic heads is influenced in such a way that the magnetic heads 8 and 9 follows the signal tracks on the record carrier more accurately or less accurately but with constant error. The parallel-connected magnetic heads 8 and 9 of the transducer arrangement then supply a signal which is available for further processing on a terminal 17. Normally the recorded signal consists of a carrier signal frequency-modulated with the television signal. The signal which is reproduced by the magnetic heads 8 and 9 is first applied to the input 18 of a demodulator 19, at whose output 20 the actual television signal is then again available. In circuit arrangement 21 the television signal is further processed in a suitable manner, so that finally the desired reproduced signal is available at the output 22.

FIG. 2 schematically represents the layout of the signal tracks on the record carrier 1. In this Figure three signal tracks which follow each other in the direction of movement 10 of the record carrier are designated 23, 24, 25, while each of said signal tracks has been recorded in the direction of the arrow 26. As can be seen, adjacent signal tracks directly adjoin each other, so as to minimize the length of record carrier needed. In order to avoid crosstalk between adjacent signal tracks during playback, magnetic heads whose effective gaps had different azimuth angles were used for recording. In FIG. 2 this is schematically indicated in that in adjacent signal tracks the positions of the synchronizing pulses of the television signals which are represented by heavier lines, one time make an azimuth angle $+\alpha$ with the track normal and the other time an azimuth angle $-\alpha$. The magnetic heads 8 and 9 used in the playback apparatus obviously also have effective gaps with azimuth angles which differ from each other by $+\alpha$ and $-\alpha$ respectively. As can also be seen in FIG. 2 each signal track contains one field of the television signal, so that every second signal track 23, 25 etc. begins with half a line of the television signal and terminates with a whole line, while the intermediate signal tracks 24 etc. start with a whole line and end with half a line. If during playback the magnetic heads exactly follow the signal tracks the reproduced signals continuously join each other at the transition from one signal track to the next signal track, while as can be seen there is no phase shift between the trains of synchronizing pulses scanned from consecutive signal tracks.

During playback of a record carrier it may happen that the magnetic heads 8 and 9 do not accurately scan the individual signal tracks, but for example owing to a constant phase error the servo system 12 scan tracks on the record carrier which have shifted parallel to the signal tracks. In FIG. 2 such tracks are represented by dashed lines and are designated 27, 28 and 29. As a result of such a track shift between the signal tracks and the tracks actually scanned by the magnetic heads, the magnetic head having an effective gap with the azimuth angle $+\alpha$ lags relative to the corresponding signal track 23, whereas the magnetic head having an effective gap with the azimuth angle $-\alpha$ leads relative to the corresponding signal track 24, as appears from the lines at the beginning and end of the signal tracks 23, 24, 25 and the tracks 27, 28, 29 which are actually scanned by the magnetic heads. This means that at the transition from one signal track 23 to the next signal track 24 the magnetic head having an effective gap with the azimuth angle $+\alpha$ has not yet left the one signal track 23, while the other magnetic head having an effective gap with the azimuth angle $-\alpha$ has already started to scan the next signal track 24. In FIG. 2 such a situation is schematically represented by the dotted lines 30 and 31, which indicate the relevant positions of the effective gaps of the two beads during a transition from one signal track to the next signal track. As can be seen, this results in the first synchronizing pulse of the signal track 24 being scanned prematurely during the transition from the signal track 23 to the signal track 24. However, this means that there is a phase shift between the train of synchronizing pulses scanned from the signal track 23 and the train of synchronizing pulses scanned from the signal track 24. At the transition from signal track 24 to the signal track 25, the magnetic head which scans the signal track 24 has already left this track because it leads, while the other magnetic head has not yet reached the signal track 25, because it lags the signal track 23 in an analogous manner, so that the first synchronizing pulse of the signal track 25 is scanned too late. However, this means that after the track transition there is again a phase shift between the train of synchronizing pulses scanned from the signal track 24 and the train of synchronizing pulses scanned from the signal track 25, but this phase shift is now of opposite polarity to the phase shift at the transition from the signal track 23 to the signal track 24. The magnitude of the phase shifts is then equal for both track transistions. The invention utilizes the fact that the polarity of the phase shifts during consecutive track transitions changes owing to the mutually different azimuth angles of the effective gaps of the two magnetic heads in order to derive an additional control signal for the servo system, which assures that the magnetic heads completely follow the signal tracks.

For this purpose there is provided circuit 32 for detecting phase shifts between consecutive pulse trains. Circuit 32 receives at its input 33 the synchronizing pulses which have been separated, with the aid of a pulse separator, from the television signal available at the output 20 of the demodulator 19 and which, as the case may be, have been correspondingly shaped. To obtain satisfactory noise immunity, the detection circuit 32 in the present example takes the form of a phase-locked loop, which in known manner consists of the series connection of a phase comparator 34, a filter 35 and a controlled oscillator 36. The output of oscillator 36 is applied to an input 37 of the phase comparator 34, which furthermore receives the synchronizing pulse trains at a second input 38. The output 39 of the detection circuit 32 is constituted by the output 40 of the phase comparator 34. The phase-locked loop may be realized in a variety of ways in accordance with the present state-of-the-art. For example, its phase comparator 34 may take the form of a synchronous demodulator or slope detector and the control oscillator may accordingly take the form of a sine wave oscillator or a sawtooth generator.

At its output 39, the detection circuit 32 supplies a pulse-shaped output signal, such as that shown in FIG. 3c, whose magnitude and polarity corresponds to the instantaneous phase shift between the synchronizing pulse trains scanned from the consecutive signal tracks during each track transition. With reference to FIG. 2 it has been explained that a parallel tracking deviation between the signal tracks on the record carrier which are actually scanned by the magnetic heads having effective gaps with mutually opposite azimuth angles and the signal tracks recorded on the record carrier gives rise to phase shifts between the synchronizing pulse trains at the track transitions whose magnitude is the same but whose polarity differs from track transition to track transistion. At the output 39, phase shifts give rise to pulse-shaped output signals of alternately different polarity, the pulses being alternately of different polarity but of the same magnitude as shown in FIG. 3a. As can be seen, the pulses of FIG. 3c differ from those of FIG. 3a since in the former the pulses are alternately of different magnitude. This may be attributed to the fact that in practice phase shifts are not only produced by tracking errors, as for example described with reference to FIG. 2, but that frequently phase shifts occur which may be attributed to, for example, length variations of the record carrier so that the tracks on the record carrier actually scanned by the magnetic heads are shorter or longer than the signal tracks recorded on the record carrier. Such phase shifts between the synchronizing pulse trains at each track transition are of the same polarity and the same magnitude. The output signals of the detection circuit 32 for these phase shifts are shown in FIG. 3b. The actual output signals of the detection circuit in accordance with FIG. 3c are then the result of the superposition of the two types of phase shifts in accordance with FIGS. 3a and 3b which are attributable to different effects.

The phase shifts of the same polarity and magnitude produced at the track transitions can be compensated for in known manner by means of control devices which influence the tension in the record carrier, so-called tape-tension control devices. However, this is not possible in the case of tracking errors which give rise to phase shifts to different polarity at the track transitions. Therefore, it is necessary to separate these two types of phase shifts from each other. To separate the two different types of phase shifts there is provided a circuit 41 for the difference formation between the pulse-shaped output signals of the phase-shift detection circuit 32, whose output signals are applied to the input 42 of said circuit. Included between the output 39 of the detection circuit 32 and the input 42 of the circuit 41 is a gate circuit 43 which for the purpose of interference suppression in principle only transfers the pulses in the output signals of the detection circuit 32. This gate circuit 43 is controlled by a monostable multivibrator 44, which produces a pulse train in accordance with FIG. 3g which opens the gate circuit 43 only during time intervals in which the magnetic heads change from one signal track to the next signal track. Control of the multivibrator is effected with the aid of the pulses supplied by the magnetic head 16, which appear upon each revolution of the transducer arrangement, and thus have a fixed time-relationship to the instantaneous positions of the two magnetic heads. This pulse train supplied by the magnetic head 16 is shown in FIG. 3d. The individual pulses of this pulse train control a first further monostable multivibrator 45, which supplies a pulse train in accordance with FIG. 3e. The trailing edge of a pulse from the monostable multivibrator 45 then defines the instant briefly before a track transition, as is indicated by the dashed line 46 in FIG. 3. These pulses from the monostable multivibrator 45 are applied to the monostable multivibrator 44 via the line 47, said multivibrator being triggered by the trailing edges of said pulses, whereupon it supplies a pulse to the gate circuit 43. The end of the relevant pulse from the monostable multivibrator 44 defines the instant which corresponds to the end of said track transition, as indicated by the dashed line 48 in FIG. 3. Furthermore, the pulses from the monostable multivibrator 45 are applied to a second further monostable multivibrator 49, which produces a pulse train in accordance with FIG. 3f, which is also applied to the monostable multivibrator 44. The trailing edge of a pulse of a monostable multivibrator 49 then defines an instant shortly before the next further track transition, as indicated by the dashed line 50 in FIG. 3, said edge again causing the monostable multivibrator 44 to supply a pulse whose end, in turn, defines the instant shortly after said further track transition, which is indicated by the dashed line 51 in FIG. 3. Thus, only the pulses contained in the output signals of the detection circuit 32 can reach the input 42 of the circuit for difference formation.

In the present embodiment the circuit for difference formation consists of a synchronous demodulator 52, having one input 53 which receives the output signals from the detection circuit 32 and a second input 54 which receives the pulses produced by the monostable multivibrator 49 upon every second track transition via line 55. With the aid of the synchronous demodulator 52 every second pulse in the output signals of the detection circuit 32 is inverted so that the signal shown in FIG. 3h appears at the output 56 of the synchronous demodulator. After integration of this output signal of the synchronous demodulator, the difference formation between the output signals of the phase-shift detection circuit 32 is already completed. However, in order to increase the signal amplitude it is effective when the output signal of the synchronous demodulator is first applied to a sample and hold device 57, which in known manner comprises a control switch 58, for example an electronic switch, via which a capacitor 59 is charged. The switch 58 is controlled by a sampling pulse train which identifies the transitions of the magnetic heads from the signal track to the next signal track, which sampling pulse train is derived from the pulse train supplied by the monostable multivibrator 44 with a further monostable multivibrator circuit 60. Thus, the sample and hold device 57 supplies a signal which corresponds to the peak values of the individual pulses contained in the output signal of the synchronous demodulator, as is indicated by the solid lines in FIG. 3i. Obviously, it is also possible to include such a sample and hold device before the input 53 of the synchronous demodulator. An integration stage 62, connected to the output 61 of the sample and hold device 57, averages the output signal of the sample and hold device forming the output signal indicated by a dashed line 63 in FIG. 3i. The output of integrater 62 is then available at the output 64 of the circuit 41 for difference formation. To obtain such an integration stage it is for example possible to employ an operational amplifier.

The output signal of the circuit 41 for difference formation which is thus obtained is now exclusively a measure of the magnitude of a parallel deviation between the tracks on the record carrier actually scanned by the magnetic heads and the signal tracks recorded on the record carrier, regardless of whether the tracks actually scanned on the record carrier by the magnetic heads are shorter or longer than the signal tracks. This output signal of the difference-forming circuit 41 is now applied to the servo system 12 via a line 65 as an additional control signal by which the drive of the transducer arrangement is influenced in such a way that the previously mentioned parallel deviation of the magnetic heads from the signal tracks is compensated for. However, other types of tracking errors are also eliminated or at least minimized by the afore-mentioned steps. If for example the two magnetic heads 8 and 9 are not disposed exactly in a plane which is perpendicular to the axis of rotation of the transducer arrangement, this results in that in particular one of the two magnetic heads scans a track which is slightly shifted parallel to the relevant signal track on the record carrier, in a similar way as described with reference to FIG. 2. As a result of this, regardless of the phase shifts which again appear at the track transitions, the television signals from the adjacent signal tracks will differ in respect of amplitude, which is of course undesirable. With the aid of the steps described hereinabove the additional control signal which is applied to the servo system in such a case influences the drive system for the transducer arrangement in such a way that eventually the two magnetic heads slightly deviate from the signal tracks in opposite directions, so that the total error is minimized. However, the television signals scanned from adjacent signal tracks by the magnetic heads then become equal again in respect of their amplitude. The same applies to those types of tracking errors for which the tracks on the record carrier actually scanned by the magnetic heads do not extend parallel but at a certain angle relative to the signal tracks recorded on the record carrier. In this case the drive system for the transducer arrangement is influenced in such a way with the aid of the additional control signal that the tracking error at the beginning and at the end of a track is equal but opposite, so that again the total error is minimized. A tracking error of the last-mentioned type occurs for example when the record carrier is not passed over the drum surface in a helical path at the correct angle.

In the example of FIG. 4 the detection circuit 32 for phase shifts between the trains of synchronizing pulses from consecutive signal tracks is again constituted by a phase-locked loop, which at its output 39 supplies the pulse-shaped output signal shown in FIG. 5a, in a similar way as in the embodiment described with reference to FIG. 1. In this case the circuit 41 for difference formation between the output signals of the detection circuit, which circuit 41 is connected to the output 39 of the detection circuit 32, consists of the two sample and hold devices 66 and 67 followed by a differential amplifier 68 for the logical combination of their output signals. One input 69 of the differential amplifier is connected to the output 70 of the sample and hold device 66 and the second input 71 of the differential amplifier to the output 72 of the other sample and hold device 67. The output signals of the detection circuit are applied to the inputs 73 and 74 of the two sample and hold devices 66 and 67.

The sample and hold devices again consist of a controlled switch 58, via switch a capacitor 59 is charged. The two switches are controlled by the sample pulse trains which identify the transitions of the magnetic heads from one signal track to the next signal track, so that the output signals of the detection circuit are alternately stored in the capacitor 59 of the sample and hold device 66 or 67. These sampling pulse trains are derived from the pulses shown in FIG. 5b, which in a similar way as in the embodiment of FIG. 1 are supplied by a magnetic head 16 upon each revolution of the transducer arrangement. For this purpose the pulses supplied by the magnetic head 16 are applied to a first monostable multivibrator 75, which supplies a pulse train in accordance with FIG. 5c. Each pulse from the magnetic head 16 then gives rise to a pulse from the monostable multivibrator 75, whose trailing edge identifies the transition from one signal track to the next signal track. This pulse train is applied to a first further monostable multivibrator 76 which at the instant of the track transition supplies a sample shown in FIG. 5, signal d, which briefly closes the switch 58 of the sample and hold device 66, so that the instantaneous signal value of the output signal of the detection circuit is transferred to the capacitor 59 of the sample and hold device 66. Furthermore, the pulse train from the monostable multivibrator 75 is applied to a second further monostable multivibrator 77, which supplies a pulse train in accordance with FIG. 5e. The trailing edge of each pulse of this pulse train defines the instant for the next transition from one signal track to the next signal track. A third further monostable multivibrator 78 which is connected to the monostable multivibrator 77 now controls the switch 58 of the sample and hold device 67, the monostable multivibrator 78 closing the switch 58 of the sample and hold device 67 by means of the sampling pulses shown in FIG. 5f, so that the instantaneous signal value of the output signal of the detection circuit is now transferred to the capacitor 59 of the sample of hold device 67. Thus the sample and hold device 67 provides an output signal in accordance with FIG. 5g and the sample and hold device 66 an output signal in accordance with FIG. 5h. The differential amplifier 68 forms the difference between these two output signals of the sample and hold devices 66 and 67, so that at its output which is at the same time the output 64 of the difference forming circuit 41, the desired additional control signal for the servo system is obtained which in FIG. 5g is represented by a dashed line 79. Further the operation of this embodiment is similar to that of the embodiment of FIG. 1.

It is evident that a number of modifications of the embodiment described hereinbefore are possible. As an example the embodiment of FIG. 4 may be modified so that as detection circuit a phase-locked loop is employed, which supplies two output signals of inverse polarity, each of which is applied to one of the two sample and hold devices, after which the two output signals of said devices are combined in a summing circuit for the difference formation. As previously stated, it is of course possible to employ any other circuit arrangement which enables the time or frequency error between the consecutive pulses to be measured for the detection of phase shifts between consecutive pulse trains instead of a phase-locked loop. Similarly, the output signal supplied by the difference forming circuit, instead of being applied to the servo system for the transducer arrangement drive, may be applied to a servo system which controls the record carrier drive as an additional control signal.

What is claimed is:

1. A tracking error detector for a playback apparatus having a rotary transducer with at least two magnetic heads whose effective gaps have mutually different azimuth angles for detecting television signals containing synchronizing pulses recorded on a record carrier in oblique signal tracks, said detector comprising means coupled to said magnetic heads for separating said synchronizing pulses from the detected television signal, means coupled to said separating means for detecting the phase shift between two consecutive synchronizing pulse trains each associated with a respective one of a pair of adjacent signal tracks and for supplying an output signal of a magnitude and polarity indicative of said phase shift which corresponds to the combined effects of tracking error and length variations of said record carrier, and means for removing from said output signal components due to length variations of said record carrier.

2. The detector according to claim 1, wherein said phase shift detection means includes a phase-locked loop.

3. The detector according to claim 1 or 2, wherein said output signal supplied by said phase shift detection means is a series of pulses and said removing means includes a synchronous demodulator having a pair of inputs and an output, an integration stage coupled to said output, means for generating a further series of pulses which identify every second transition of said magnetic heads from one signal track to the next signal track, means for coupling said output signal to one of said inputs and means for coupling said further series of pulses to the other of said inputs of said demodulator.

4. The detector according to claim 1 or 2, wherein said output signal supplied by said phase shift detection means is a series of pulses and wherein said removing means includes means for generating a further series of pulses which identify the transitions of said magnetic heads from one signal track to the next signal track, and two sample and hold devices coupled to said generating means, said sample and hold devices respectively storing alternate pulses of said output signal in response to said pulses of said further series.

* * * * *